April 3, 1945. A. J. WICKENS 2,372,754
ADJUSTABLE CABLE SPLICING CLAMP
Filed Sept. 4, 1943

INVENTOR:
Alexander J. Wickens
By: Alex. E. MacRae
ATTORNEY.

Patented Apr. 3, 1945

2,372,754

UNITED STATES PATENT OFFICE 2,372,754

ADJUSTABLE CABLE SPLICING CLAMP

Alexander John Wickens, Sioux Lookout, Ontario, Canada

Application September 4, 1943, Serial No. 501,245
In Canada September 8, 1942

2 Claims. (Cl. 81—18)

This invention relates to cable splicing clamps.

While various types of clamps of this nature have heretofore been proposed, such clamps are usually subject to the disadvantage that they may be employed with cables of specific sizes only.

It is an object of the present invention to provide a clamp of simple and inexpensive manufacture and which is adjustable whereby it may be employed with cables of a substantially wide range of sizes.

Other objects and advantages of the invention will become apparent from the following description of the invention with particular reference to the accompanying drawing, in which.

Figure 1:
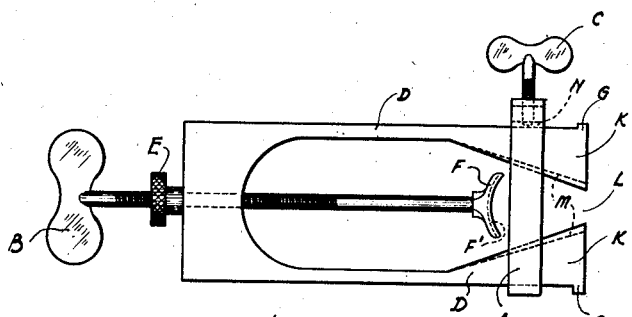
Figure 1 is a side elevation of the clamp in accordance with the invention.
Figure 2:
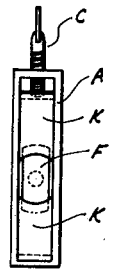
Figure 2 is an end elevation.

In the drawing, D, D are the opposing jaws formed by a substantially U-shaped member of spring steel or like material. The forward ends of the jaws have inclined inwardly extending portions K to form a relatively small mouth opening L, and the inner surfaces of such portions are channelled as indicated at M.

Means for imparting a closing movement to the spring jaws D, D, that is a movement towards each other, comprises a rectangular collar A surrounding the jaws. A screw C has threaded engagement with the collar and carries a pivotal bearing member N at one end in engagement with the outer surface of one of the jaws and means such as wings, as shown, at the other end for manual rotation thereof. Stops G for the collar may be provided on the jaws.

A screw B extends through and in threaded engagement with the base of the U-shaped member and carries at its inner end a pivotal bearing member F having a curved inner surface preferably provided with a channel F' for engagement with a cable. The outer end of the screw B is provided with wings for manual rotation thereof. A lock nut E may be provided for the screw B.

A thimble I having a curved end complementary to the curved surface of member F and inclined sides complementary to the inclined surfaces of jaw portions K is also provided.

Figure 3:
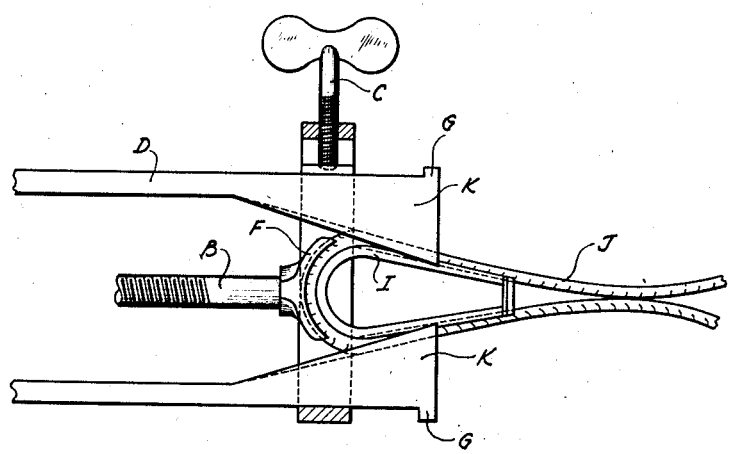
Figure 3 is a side elevation, partly in section, of the clamp in operative position with respect to a cable.

In use, with the jaws in normal unflexed position and member F in withdrawn relation, a cable, such as indicated at J, is looped around thimble I and inserted between the jaws as shown in Figure 3, the side portions of the loop entering the channels as illustrated. The collar A is now moved along the jaws to an effective clamping position and the screw C rotated to close the jaws and grip the cable between the same and the thimble. The screw B is now rotated to place the member F into firm engagement with the end of the cable loop to grip the same between the member and the complementary thimble portion.

It will be observed that the structural features of the clamp described result in a particularly firm and effective gripping action on the cable and that cables of a relatively wide range of sizes may be handled with a single clamp of the design described. Such a clamp is of particular utility in the handling of airplane cables. Such cables are of several different sizes and it has been common practice to employ a clamp of particular dimensions for each size of cable. A clamp in accordance with the present invention may be employed to handle substantially all sizes of airplane cables in use.

It will be apparent that various changes in structural details may be made without departing from the spirit of the invention as defined in the appended claims.

I claim:

1. A cable splicing clamp comprising a U-shaped spring steel member constituting a pair of opposed jaws, the inner opposed surfaces of said jaws being channelled to receive cables, a thimble having surfaces complementary to said opposed surfaces and adapted to be placed between said jaws with a cable loop surrounding the same, means for closing the jaws to grip the cable loop between the jaw and thimble surfaces comprising a collar slidably mounted on said member and extending around the outer surfaces of said jaws, and a bearing member carried by the collar and bearing on the outer surface of one of said jaws, a portion of the collar having bearing engagement with the outer surface of the other of said jaws, and means carried by the collar for applying pressure on said bearing member, and additional means for gripping said cable loop comprising a screw extending through the base of the U-shaped member, and a member carried by said screw to engage the end of the loop against the thimble.

2. A cable splicing clamp comprising a substantially U-shaped member of spring steel constituting a pair of spaced jaws, the inner opposed surfaces of said jaws having inclined channelled surfaces adapted to receive a cable loop, a thimble about which said cable loop is adapted to be formed and adapted to be placed between said jaws, said thimble having surfaces complementary to said inclined jaw surfaces, a collar surrounding said jaws and carrying a screw having a bearing member engaging one of said jaws, collar aligning stops on said jaws, said bearing member being movable to effect a closing movement on said jaws to grip the cable loop between the inclined jaw surfaces and the thimble, and additional cable loop gripping means comprising a screw extending through the base of said U-shaped member, and a channelled cable loop engaging member pivotally carried by said screw, said thimble also having a surface complementary to said cable loop engaging member, and means for locking said latter member in cable gripping position.

ALEXANDER JOHN WICKENS.